Oct. 10, 1950

H. F. HOBBS 2,524,975

POWER TRANSMISSION APPARATUS

Filed April 9, 1947

INVENTOR:

HOWARD FREDERICK HOBBS.

BY: *Young, Emery & Thompson*

ATTORNEYS

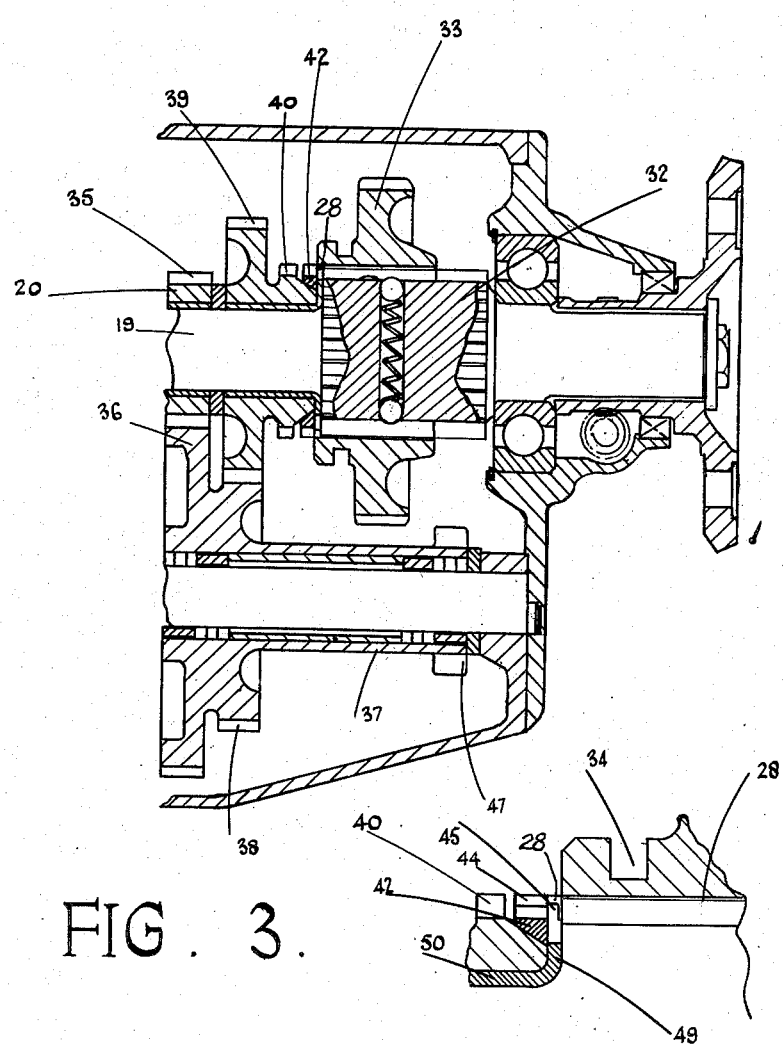

Patented Oct. 10, 1950

2,524,975

UNITED STATES PATENT OFFICE 2,524,975

POWER TRANSMISSION APPARATUS

Howard Frederick Hobbs, Leamington Spa, England, assignor to Hobbs Transmission Limited, London, England Application April 9, 1947, Serial No. 740,426
In Great Britain April 17, 1946

3 Claims. (Cl. 74—740)

This invention relates to power transmission apparatus of the kind comprising an input shaft, an output shaft, two intermediate members, means including at least two progressively engageable clutches associated with a differential gear adapted for distributing power as between one of the said shafts on the one hand and the said members on the other hand in at least three different ratios. Examples of such apparatus are described in the specification of British Patent No. 549,988 of March 24, 1941.

According to the invention an apparatus of the kind defined has a reaction brake associated with one of the intermediate members whereby during one phase of operation one part of the differential gear is held stationary and the differential gear used to provide a required ratio.

The intermediate members may be concentric shafts and the inner intermediate shaft may serve also as the output shaft, and the apparatus may include a gear train adapted to connect the two intermediate shafts, and a dog-clutch may be provided for making and breaking this connection, whereby two transmission ratios can be obtained with said shafts connected and two ratios obtained with said shafts disconnected (by engagement and disengagement of the clutches and brake) it therefore being necessary to disengage the dog clutch in changing to a lower ratio, and engage the dog clutch when changing to a higher ratio.

This has a particular advantage as there are difficulties associated with synchronising the speeds of and engaging dog-clutch teeth for up change of ratio with the engine operating under part or full throttle but no similar difficulties for down change of ratio.

The apparatus may be constructed to provide an overdrive ratio, means being also provided to hold stationary the remainder of the engaged gear wheels during operation in overdrive with consequential improved efficiency and reduced noise.

A constructional form of the invention will now be described by way of example with reference to the accompanying diagrammatic drawings wherein Figure 1 is a vertical longitudinal section of the forward part of an apparatus made in accordance with the invention;

Figure 2 is a similar view of the rear part thereof; and

Figure 3 is an enlarged view of a part shown in Figure 2.

Figure 1:
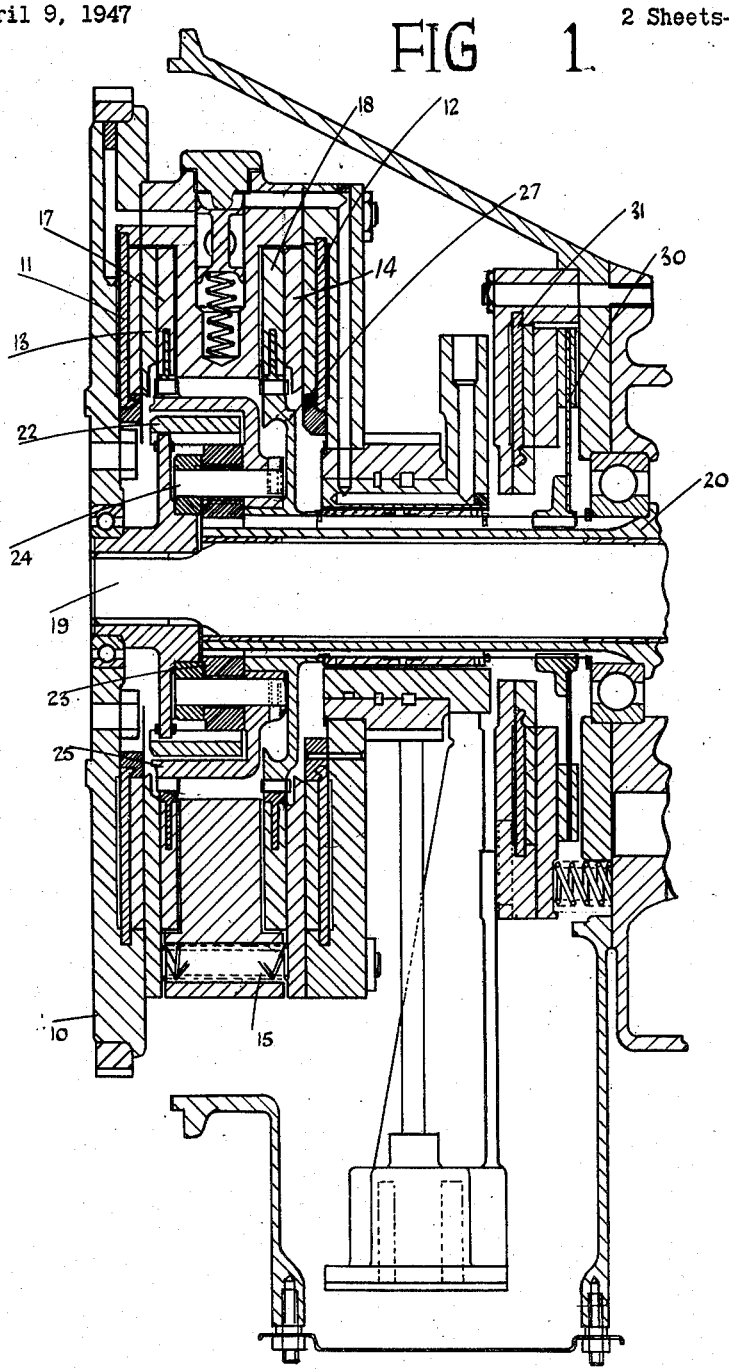

A housing 10 (carried by the crankshaft of a motor-car engine) contains two sets of clutch elements operable hydraulically through two flexible diaphragms 11, 12. These elements include two pressure rings 13, 14, pressed away from each other by a common set of springs 15, and adapted to grip one or other or both of two friction discs 17, 18. Two coaxial intermediate shafts 19, 20, are provided the inner one of which carries a ring 22 provided with an inwardly projecting set of gear teeth forming the outer member of an epicyclic differential gear train. This train also includes a set of planetary pinions 23 which mesh with the outer portion of the member and with teeth on the outer intermediary shaft 20, the pinions being mounted on pivots 24 carried by a disc 25 on which the front friction disc 17 is mounted. The outer intermediate shaft 20 also carries a disc 27 on which the second friction disc 18 is mounted. Also carried by the outer intermediate shaft is a friction disc 30 associated with brake elements carried by the fixed housing of the apparatus which includes another flexible diaphragm 31 for actuating the brake elements.

The inner intermediate shaft serves as the output shaft and has a part 32 of enlarged diameter which is splined. The splines carry a slidable gearwheel 33 which has internal teeth 28 engaging the splines, and external gear teeth, and a groove 34 for engagement by a striker arm. The rear end of the outer intermediate shaft carries a pinion 35 which is permanently meshed with a gearwheel 36 fixed on a layshaft 37. The layshaft carries a pinion 38 which is in permanent mesh with a gearwheel 39 that is freely mounted on the output shaft and has a set of dog clutch teeth 40 cut on the rear end of it. The clutch teeth 40 can be engaged by the corresponding teeth 28. A baulk ring 42 is disposed between the two sets of clutch teeth.

The baulk ring is toothed and has the outer ends 44 (Figure 3) of the teeth reduced in thickness and the inner ends of the engaging internal teeth 28 are removed for a short distance as at 45. The thin portions 44 of the baulk ring teeth therefore first engage with slack and the full sized parts of the teeth 28 are baulked by the full sized parts of the baulk ring teeth.

The baulk ring is held in position by a flange 49 on a bush 50. The layshaft carries another pinion 47 with which the splined gearwheel 33 can engage.

It will be seen that the intermediate shafts 19, 20 are connected by the gear train 35, 36, 38, 39 when the dog-clutch is engaged and this connection is broken by disengaging the dog-clutch.

The apparatus provides the following transmission ratios:

Two "emergency" low ratios in which the dog clutch 28, 40, is disengaged and the pinion 47 is engaged by the gearwheel 33. The highest of these ratios is obtained with the clutch 18 engaged and the other is obtained with the front clutch 17 engaged.

There are then four normal ratios. The first is obtained with the clutch 18 engaged and the dog clutch 28, 40 engaged, and the second ratio is obtained with the clutch 17 and the dog clutch 28, 40 engaged. The third ratio is obtained by disengaging the dog clutch 28, 40 and by engaging both clutches 17 and 18 simultaneously whereby the planetary train is locked and direct drive ensues. The fourth ratio is an overdrive and is obtained with the dog clutch 28, 40 disengaged by engaging the front clutch 17 and the reaction brake 30 whereby the outer intermediate shaft is held stationary and consequently the layshaft and gearwheel and pinions carried thereby and those geared to it are all held stationary during overdrive. The overdrive ratio is provided by the differential gear, one part of which is held stationary namely the part constituted by the forward end of the shaft 20. The reaction brake 30 at this time carries a torque which is less than half of the input torque.

It will be appreciated that in changing successively through all the normal ratios the dog-clutch is only changed once and its disengagement is only required when passing from a higher to a lower ratio.

Any suitable control apparatus may be provided for effecting change of ratio and selection—for example the apparatus described in the specification of my British Patent No. 619,234.

I claim:

1. A power transmission apparatus comprising a rotary member, a first intermediate shaft, a clutch for coupling the intermediate shaft to the rotary member, a second intermediate shaft, a differential gear connecting said intermediate shafts and having a driving element, a second clutch for coupling the driving element of the differential gear to said rotary member, and a reaction brake for holding said first intermediate shaft stationary, said second intermediate shaft serving as an output shaft, a gear train interposed between said intermediate shafts and a dog clutch for making and breaking the connection between said output shaft and said gear train.

2. A power transmission apparatus comprising a rotary member, a first intermediate shaft, a clutch for coupling the intermediate shaft to the rotary member, a second intermediate shaft, a differential gear connecting said intermediate shafts and having a driving element, a second clutch for coupling the driving element of the differential gear to said rotary member, and a reaction brake for holding said first intermediate shaft stationary, said intermediate shafts being concentric and said second intermediate shaft serving as an output shaft, a gear train interposed between said intermediate shafts and a dog clutch for making and breaking the connection between said output shaft and said gear train.

3. A power transmission apparatus comprising a rotary member, a first intermediate shaft, a clutch for coupling the intermediate shaft to the rotary member, a second intermediate shaft, a differential gear connecting said intermediate shafts and having a driving element, a second clutch for coupling the driving element of the differential gear to said rotary member, a reaction brake for holding said first intermediate shaft stationary, said intermediate shafts being concentric with the first shaft forming the outer shaft and the second shaft forming the inner shaft, a pinion fixed on the outer shaft, a lay shaft, a gear on the lay shaft in mesh with said pinion, a pinion on the lay shaft coupled to said gear, a gear freely mounted on the output shaft in mesh with the pinion on the lay shaft, an additional pinion on the lay shaft, a gear splined to said output shaft, and a dog clutch for coupling said splined gear to the freely mounted gear in one position of the splined gear, said splined gear meshing with the additional pinion in another position of the splined gear.

HOWARD FREDERICK HOBBS.

REFERENCES CITED

The following references are of record in the file of this patent:

UNITED STATES PATENTS

| Number | Name | Date |
|---|---|---|
| 2,037,787 | Hughes | Apr. 21, 1936 |
| 2,204,779 | Swennes | June 18, 1940 |
| 2,381,786 | Tyler | Aug. 7, 1945 |

FOREIGN PATENTS

| Number | Country | Date |
|---|---|---|
| 22,299 | Great Britain | Oct. 5, 1905 |
| 560,379 | Great Britain | Apr. 3, 1944 |